Sept. 17, 1963 F. S. MALICK 3,104,350
STATIC CONTROL FOR STEP TYPE TRANSFORMER REGULATOR
Filed June 6, 1958 2 Sheets-Sheet 1

Inventor
Franklin S. Malick
by Robert B. Benson
Attorney

Sept. 17, 1963 F. S. MALICK 3,104,350
STATIC CONTROL FOR STEP TYPE TRANSFORMER REGULATOR
Filed June 6, 1958 2 Sheets-Sheet 2

Inventor
Franklin S. Malick
by Robert B. Benson
Attorney

United States Patent Office 3,104,350
Patented Sept. 17, 1963

3,104,350
STATIC CONTROL FOR STEP TYPE TRANS-
FORMER REGULATOR
Franklin S. Malick, Monroeville, Pa., assignor to Allis-
Chalmers Manufacturing Company, Milwaukee, Wis.
Filed June 6, 1958, Ser. No. 740,303
13 Claims. (Cl. 318—264)

This invention relates generally to control systems and in particular to an automatic control system, as in voltage regulation, for sensing deviation of an electrical condition and for initiating a control function in response to the deviation. Automatic controls of the type to which this invention relates may be utilized for step type transformer regulators.

Such control systems as this invention relates to have in the past included electromechanical elements that are affected by shock, vibration, wear, dust and other adverse conditions.

The disadvantages of controls embodying mechanical actuated elements, as well as those of a magnetic nature involving electronic tube components, are avoided in accordance with the teaching of this invention in which the control circuit for a regulator is comprised only of static magnetic elements and connecting static circuitry.

An object of this invention is to provide a new and improved control system.

Another object of this invention is to provide a new and improved voltage regulating control for step type transformers.

Another object of this invention is to provide a new and improved static voltage regulating control.

Another object of this invention is to provide a new and improved electromagnetic electrical control regulating system for voltage regulators of transformers including electro magnetic voltage sensitive means providing signals outside of a desired voltage band as well as electromagnetic time delay means.

These and other objects and advantages of this invention will be apparent from the following description when read in connection with the accompanying drawings in which.

Figure 1:
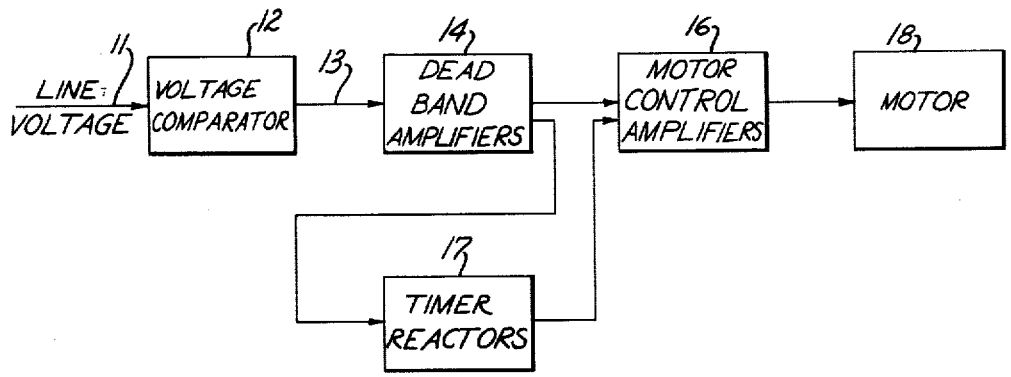
FIG. 1 is a block diagram of an embodiment of the control system of this invention.

Broadly the invention can first be considered in connection with the block diagram of FIG. 1. Voltage from the output of a regulated transformer is represented by line 11. That voltage or a measure thereof is fed to a voltage comparator 12 of the control system. The line voltage is compared with a stable reference voltage, and any voltage deviation is represented symbolically as line 13 emanating from the voltage comparator and supplying electromagnetic dead band amplifiers 14. These amplifiers, which are preferably designed to be the snap acting type, give no output if the voltage deviation is within a certain acceptable band. That deviation then would be within the conventional dead band known in the transformer regulator art. If, however, the voltage of the line is sufficiently higher or lower than that of the reference, the voltage deviation signal is such that one of the dead band amplifiers provides an output.

The output from the dead band amplifier is fed as an input to two electromagnetic circuit elements, i.e., motor control amplifier 16 and time delay means 17. The input to the motor control amplifier tends to cause power to be supplied to a load such as reversible motor 18 and drive it in the direction required for a tap change on the regulator transformer to correct the voltage deviation. However, this effect is temporarily delayed because of the simultaneous signal supplied from the dead band amplifier to the timer reactor. This delay results because the time delay means sends a signal to the motor control amplifier temporarily nullifying the effect of the signal directed to the control amplifier from the dead band amplifier.

The output from the dead band amplifier to the time delay means begins a measure of time delay. So long as there is a signal from the time delay means, amplified if desired, to the motor control amplifier the dead band amplifier signal directed to the motor control amplifier is ineffective to cause motor operation. Consequently, there is a controllable period of time after a signal from the dead band amplifier during which the motor is inoperative. This result is desired in regulating systems to avoid voltage adjustments in response to short transient voltage conditions. After this timing period which is controlled by the time delay means, the output from the time delay means drops to zero, and the signal directed from the dead band amplifier to the motor control amplifier is effective. As a consequence the motor operates to tap change the voltage regulator transformer through conventional apparatus (not shown).

Motor 18 runs in one direction or the other depending on which terminal the D.C. voltage is applied to.

In addition to the specific components of the system illustrated in the block diagram, there is, of course, a suitable supply source for the system elements. The line voltage from the transformer regulator may serve as that supply means.

*Current Supply*

Figure 2:
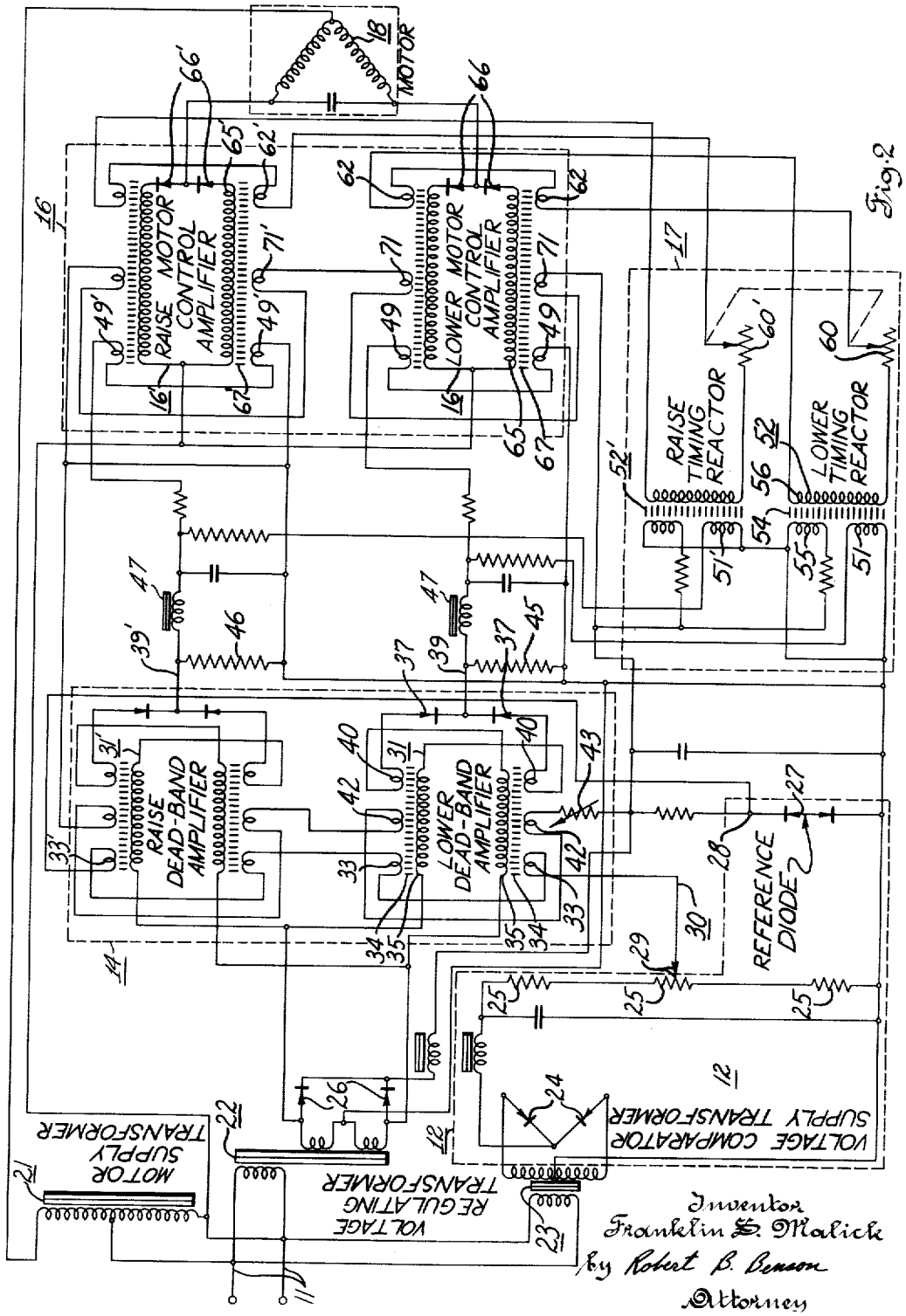
FIG. 2 is a circuit diagram of the system elements shown in the block diagram of FIG. 1.

This supply means is illustrated in FIG. 2 and characterized generally by the line 11 as in FIG. 1. The supply may be divided into several parts, depending upon the elements served. Preferably, the static system elements are provided with a rather stable source.

The system supply means shown originates at the line to be controlled. That line 11, in a preferred embodiment, feeds the primaries of three transformers 21, 22 and 23.

Transformer 21 is an autotransformer supplying the controlled motor and the reactance windings of the motor control amplifier.

The voltage to the autotransformer primary may be from 105 to 135 volts, as a typical example. Transformer 21 steps that voltage up to about 200 volts to supply motor 18. Transformer 22 provides a substantially constant voltage to dead band amplifiers 31, 31', as it is desirable to avoid supplying those amplifiers from a voltage source variable to the extremes of the line voltage, i.e., 105 volts to 135 volts for example.

*Voltage Comparator*

The third transformer 23 supplies voltage comparator 12. As mentioned above, the voltage comparator 12 measures the line voltage against a stable reference voltage and detects any deviation. It includes a winding having the variable line voltage of transformer 23, rectifier means 24 providing full wave rectification of the secondary of transformer 23, load resistors 25 in circuit with the direct current terminal of the rectifier to provide at tap 29 a D.C. measure of the line voltage. The comparator 12 also includes as a stable reference a substantially constant D.C. voltage source from the secondary of transformer 22 and rectifiers 26 to reference diode means 27 to provide at terminal 28 a constant D.C. voltage reference. Between terminal 28 and tap 29 there is an output circuit 30 of the comparator. The potential difference between tap 29 and terminal 28 is the line voltage deviation, and tap 29 may be either above or below the potential of terminal 28. The reference diode 27 is preferably a silicon semiconductor which has a non-linear characteristic such that it maintains a constant voltage across it for a wide range of currents. Output circuit 30 supplies signal current to control windings 33, 33' on dead band amplifiers 31, 31'.

Dead Band Amplifiers

There are two dead band amplifiers in the illustrated system, and the components of each are similar. One of the dead band amplifiers is identified as the lower dead band amplifier 31 and the other as the raise dead band amplifier 31'.

If the line voltage drops below the predetermined value for which it is set, the raise dead band amplifier 31' comes into play; whereas if the line voltage becomes greater than the predetermined value, the lower dead band amplifier 31 is effective. Since the components of the two amplifiers are similar, a description of the components of only the lower dead band amplifier will be made with the recognized distinction that one operates when the potential of tap 29 is above the potential of terminal 28 and the other operates when the potential of that tap is below the potential of terminal 28.

As above mentioned, output circuit 30 of the voltage comparator comprises leads to control windings 33, 33' on the dead band amplifiers. The lower dead band amplifier 31 is preferably a self-saturating magnetic amplifier having cores 34, reactance windings 35 and control windings 33. The reactance windings 35 are in series circuit with an A.C. voltage source such as the secondary winding of transformer 22, and therefore limits the current flowing from the source to an output circuit 39 through self-saturating rectifiers 37 and positive feedback windings 40. The positive feedback windings give the amplifier a snap acting characteristic well known in the art and comparable to a conventional on-off switch. Further, each of the magnetic cores 34 of the dead band amplifiers is provided with windings 42 for supplying bias ampere turns. The D.C. source for these bias windings 42 is from the output terminals of full wave rectifiers 26 associated with the secondaries of transformer 22. The circuits from those rectifiers feeding the bias windings preferably include a dead band adjusting resistor 43 for varying the bias on the dead band amplifiers. This same bias circuit may, as in the illustrated embodiment, be common to each of the magnetic cores of both the lower and the raise amplifiers 31, 31' of the system.

The output voltage of the lower and raise dead band amplifiers is developed across resistors 45 and 46, respectively. This output voltage, which supplies control current to a control winding on the motor control amplifier, either the lower or the raise amplifier, tends to be effective to turn on the output of the motor control amplifiers, thereby supplying the current to the motor 18.

Suitable chokes 47 may be inserted in the control circuits of the motor control amplifiers to prevent any reduction in the gain of the system because of the characteristic these amplifiers have for developing fundamental voltages in the control windings.

The amplifier 31 thus is generally conventional of saturating reactors with the rectifiers in series with the reactor windings having such polarities that the two circuits are conducting during opposite half cycles of the alternating current source of transformer 22 to provide a substantially constant D.C. current to the output circuit 39.

Output circuit means 39 supplies the control windings 49 on the lower motor control amplifier 16 and through a parallel circuit branch supplies winding 51 on the lower timing reactor 52.

A similar output circuit 39' supplies D.C. current to control windings 49' on the raise motor control amplifier 48' and through a parallel circuit branch supplies winding 51' on the raise timing reactor 52'.

Time Delay Means

The time delay means comprise two similar reactors 52, 52', one for the lowering voltage circuitry and the other for the raise voltage circuitry. Since these timing reactors are similar to each other only the lower reactor will be described in detail. The lower reactor comprises a saturable core element 54, a pair of primary windings 51, 55 and a secondary winding 56. The primary windings are both supplied by direct current. The winding 55 is a direct current bias winding supplied with D.C. current from the rectified secondary of transformer 22 which is the same source that supplies current to the reference diode 27. The other primary windings 51 are supplied direct current from the output of a corresponding one of the dead band amplifiers. The lower timing reactor is supplied direct current from the output of a corresponding one of the dead band amplifiers. The lower timing reactor is supplied direct current from the lower dead band amplifier output; whereas the raise timing reactor is supplied direct current from the output of the raise dead band amplifier. Inductively related to these two primary windings 51, 55 on the same magnetic core is a secondary winding 56 which comprises the output of the timing reactor.

The timer output and consequently the time delay period can be adjusted by means of variable resistor 60 in series circuit with the output of secondary winding 56.

During the period when the flux in the iron core of the timing reactor is changing as a result of current flow in an associated output circuit of one of the dead band amplifiers, there is output current flow from the secondary winding of the timing reactor. That output supplies control windings 62 or 62' on the associated motor control amplifier and the ampere turns from those control windings in the magnetic circuit of the motor control amplifier are in opposition to the ampere turns of the control winding on that amplifier supplied directly from the output of the dead band amplifier.

The use of two timing reactors is desired for the preferred operation and control of the line voltage. This will be apparent when it is considered what occurs when the raise timing reactor is at positive saturation and the regulated voltage suddenly increases to a voltage on the high side of the dead band. Such a change in the condition of the regulated system results in the lower dead band amplifier effecting full output. With this set of circumstances the raise timing reactor is being driven towards negative saturation at the same time the lower timing reactor is being driven toward positive saturation and the operation of the overall circuit is normal. However, in instances when only one timing reactor is used, there is no time delay under this set of circumstances because there would be no time available for resetting the core to negative saturation preparatory to the new timing operation.

An important feature of the timer is that it operates during reset as it does during the timing operation. This means that a return of the voltage to within the dead band prior to motor operation will cause time to be "subtracted" from the timer. The timer thus sums or integrates time and the line voltage change is caused only when the net time outside the dead band exceeds the selective period of time for which the timing reactor is set.

In the preferred embodiment due to the constant voltage source 22 and the snap action of the dead band amplifiers, the signal to the control windings 51 or 51' on the timing reactors is constant regardless of the deviation of the line voltage. Therefore, bias winding 55 can be set so that the ampere turns in that winding equal one-half the ampere turns in the control winding 51 so that the timing reactor operates at the same rate during reset as it does during the timing operation. In such an arrangement the timing device gives an accurate indication of the net time that the line voltage is operating outside of the dead band. On the other hand, if the dead band amplifiers were not of the snap acting type but rather are amplifiers having an output proportional to the input signal, the time required to force the timing reactor to positive saturation would vary depending on the magnitude of variation of the line voltage. However, the rate of the operation of the reactor during reset would be constant. In such an arrangement the timing reactor integrates the magnitude of the deviation from the dead band limits over the time of out of band operation and compares this integral to the integral of the reset function of the timing reactor. In this manner the motor control amplifier is operated only when the integrated voltage deviation outside of the dead band exceeds a predetermined value for which the timing reactor is set.

*Motor Control Amplifiers*

The motor control amplifiers are self-saturating magnetic amplifier type devices and there is a motor control amplifier for the lowering circuit and one for the raising operation. Lower motor control amplifier 16 is connected to one terminal of motor 18, and the raise motor control amplifier 16' is connected to another terminal of the motor for running the motor in the opposite direction. Since the motor control amplifiers are similar only the lower motor control amplifier will be described in detail. The motor control amplifiers are connected in circuit with the windings of a motor to control the flow of current to the motor windings and thereby control the operation of the motor. In the prefered embodiment as shown, the lower motor control amplifier is made up of two separate magnetic circuits. Specifically, the reactance windings 65 and associated reactifiers 66 in series therewith are in series circuit with a terminal of the motor and with an A.C. source such as the secondary of transformer 21. The saturable core 67 for each reactance winding has inductively related thereto three D.C. control windings 49, 62, 71. One is a D.C. bias 71 supplied from the substantially constant voltage source of the secondary of transformer 22. A second of the D.C. control windings 49, having ampere turns tending to drive the core toward saturation so that an output voltage will be applied to the motor terminal, comprises the control winding 49 in series circuit with the output of the lower dead band amplifier 31. Whereas the D.C. bias windings of the two motor control amplifiers may be in series circuit relationship and have a common source, it is to be noted of course that the control windings 49, 49' are not so interconnected and that the output of the lower dead band amplifier feeds only the control windings 49 associated with the lower motor control amplifier, and that the output of the raise dead band amplifier feeds only its associated control windings 49' of the raise motor control amplifier. The third D.C. control winding 62 associated with or inductively related to the reactor cores of the motor control amplifier 16, is supplied from the output circuits of the timing reactors. That is, the output circuit of the lower timing reactor is connected in series relation with the two control windings 62 of the lower motor control amplifier and the output circuit of the raise timing reactor is similarly connected to the two control windings 62' of the raise motor control amplifier. These last mentioned control windings provide ampere turns on the associated cores in opposition to those of the control windings 49 fed from the dead band amplifier, consequently tending to prevent the effectiveness of the current flow from the dead band amplifier directly to the motor control amplifier.

Figure 3:
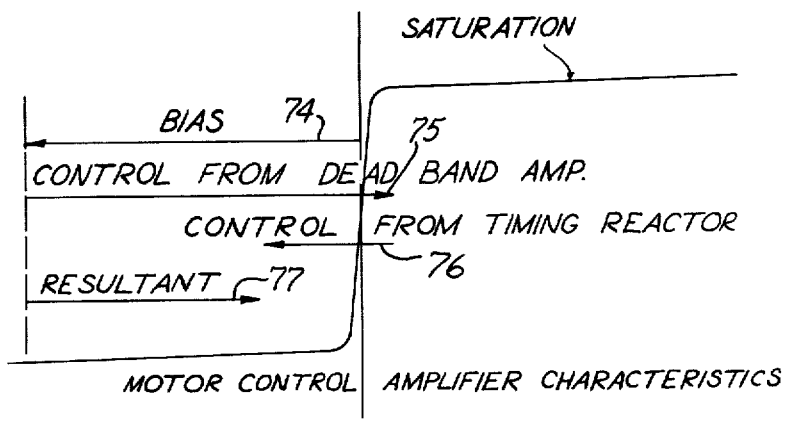
FIG. 3 shows curves illustrating the operation of the motor control amplifiers embodied in the circuit in accordance with this invention.

While the ampere turns of control windings 49 and 62 may be equal, the operation is improved if the ampere turns of control winding 62 supplied directly from the timer reactor are less than the ampere turns required to drive the motor control amplifier to saturation. Of course, the effective ampere turn on the core of the motor control amplifier during the timing period must be less than enough to drive the motor control amplifier to saturation. And the ampere turn effect of winding 49 must be sufficient to saturate the core. In FIG. 3 line 74 indicates the flux produced by the ampere turns of bias winding 71 and line 75 indicates the flux produced by the ampere turns of winding 49 when the line voltage is outside the dead band. Character 76 indicates the opposing ampere turns of winding 62 supplied by the time reactor. Consequently, for the time delay period of say 45 seconds the resultant or effective ampere turns of the windings 49 and 62 is represented by line 77. It will be noted that this effective ampere turn is less than that required to saturate the motor control amplifier.

When the timing period expires the ampere turns of winding 62 disappear and winding 49 becomes fully effective to drive the core of the motor control amplifier to saturation and voltage is supplied to motor 18.

The reason for having a greater effective signal from winding 49 may be explained by example. Say the line voltage is outside the dead band, for only 20 seconds of a 45 second timing period. If the line voltage returns to within the dead band the signals directly from the dead band amplifier to the control winding 49 of the motor control amplifier will drop to zero. However, the timing reactor output will not drop to zero but will reverse polarity as it desaturates or resets to zero time as a result of the effect of bias winding 55. Consequently, unless the ampere turn effect of control winding 62 supplied by the timer is less than that required to drive the motor control ampliler core to saturation, the motor will have voltage applied thereto and start to run.

*Operation*

Operation of the magnetic amplifier control illustrated in the drawing can be understood if it is considered as utilized in conjunction with the line voltage to be regulated. Assume that the line voltage is desired to be maintained at 115 volts. Assume also that the dead band adjustment is set, that a voltage of 117 volts will cause operation of the motor to lower that voltage and that a line voltage of 113 volts will be effective to cause the motor to operate to raise that voltage.

With the control system thus set to control the voltage at 115 volts, the potential at tap 29 on the comparator resistor would equal the potential at terminal 28 or the voltage across the reference diode in the voltage comparator. Consequently, no current flows to the control windings on either of the dead band amplifiers from the voltage comparator.

However, with an increase of voltage to 117 volts, the potential at tap 29 on the comparator resistor increases proportionally and exceeds the potential or voltage of the reference diode, and a resulting current flows in the control windings 33, 33a of the dead band amplifiers fed by the comparator output circuit. The direction of this current flow reverses if the potential at tap 29 is lower than that of terminal 28. In the instance when the line voltage is 117 volts, the direction of current flow from the comparator is effective only on the lower dead band amplifier. That is, only that amplifier is driven to saturation with a resulting voltage applied to load resistor 45 in circuit with it. The ampere turn effect on the raise dead band amplifier is ineffective to saturate the cores thereof.

Consequently, at 117 volts on the line, the direction of the signal current from the comparator is such as to cause only the lower dead band amplifier to snap up to full output. The direction of this signal current, through the raise dead band amplifier is ineffective on the output of that amplifier, which remains at zero.

The output voltage of the lower dead band amplifier in turn causes a control current to flow in control windings 49, of the lower motor control amplifier 16. However, this control current does not cause an operation of the motor because of the substantially simultaneous control signal from the output of the timing reactor which cancels out the effectiveness of the control current ampere turns from the dead band amplifier.

The timing circuit signal to the motor control amplifier results in the following manner. Upon the detection of a line voltage change beyond the band width, as for example a change to the mentioned 117 volts, the appearance of full output voltage from the lower dead band amplifier causes a D.C. current to flow in signal winding 51 of lower timing reactor 52. That D.C. signal drives the core of the timing reactor from negative saturation to positive saturation, and while the flux in the core is changing, current is induced in secondary winding 56 of the timing reactor. This induced current flows through control windings 62 on the lower motor control amplifier preventing the signal current from the dead band amplifier to the motor control amplifier from being effective. When the flux of the core of the lower timing reactor reaches positive saturation, the current induced in the secondary winding circuit drops to zero and with it the output of the lower timing reactor drops to zero. This cuts off the ampere turn effect of control windings 62 of the motor control amplifier. With the loss of this control current the motor control amplifier is driven to full output voltage by the control current directly from the dead band amplifier. The full output voltage from the motor control amplifier will cause tap changing motor 18 to run in the direction to change the tap position on the regulated transformer to the next lower voltage step.

Upon reduction of the line voltage, the secondary transformer 23 will drop from the voltage corresponding to 117 volts to 115 volts or at least back within the dead band. The voltage at the tap of the comparator resistor will again equal the voltage across the reference diode and there will be no current flow to the control winding 33 of the lower dead band amplifier. That amplifier will lose its control ampere turns; its output will drop to zero, and the control current to the winding 49 of the lower motor control amplifier will disappear, cutting that amplifier off due to the action of the bias current supplied to that amplifier. At this time, the signal current to the winding 55 of the lower timing reactor has disappeared, and the timing reactor bias current drives the core of that reactor back toward negative saturation. During this flux change, current is induced in the secondary winding of the timing reactor, but this induced current is not sufficient to drive the motor control amplifier to saturation and its output remains zero.

If the line voltage were to drop to 113 volts, the operation of the control system would be similar except for the fact that the raise components would be operative instead of the lower components.

It is apparent that the invention is not limited to the particular features of design and construction described herein and shown in the drawing, and that the invention includes such other forms and modifications as are embraced within the scope of the annexed claims.

What is claimed is:

1. A device for regulating voltage comprising a first magnetic amplifier for producing an output for a predetermined minium control signal, a timing reactor having a control winding energized by the output of said magnetic amplifier, said reactor having a bias winding opposing the effect of said control winding and an output winding inductively related to said control winding for producing a signal, a second magnetic amplifier having a first control winding energized by the output of said first magnetic amplifier and a second control winding energized by the output signal from said timing reactor, said second control winding counteracts the effectiveness of said first control winding until the core of said timing reactor is driven to positive saturation.

2. A device for regulating voltage comprising a snap action magnetic amplifier for producing a constant output for a predetermined minimum control signal, a timing reactor having a control winding energized by the output of said snap action magnetic amplifier, said reactor having a bias winding opposing the effect of said control winding and an output winding inductively related to said control winding for producing a signal, a second magnetic amplifier having a first control winding energized by the output of said snap action magnetic amplifier and a second control winding energized by the output signal from said timing reactor, said second control winding counteracts the effectiveness of said first control winding until the core of said timing reactor is driven to positive saturation.

3. A device for summing an out of band voltage regulating operation comprising a snap action magnetic amplifier for producing a constant output for a predetermined minimum control signal, a timing reactor having a control winding energized by the output of said snap action magnetic amplifier, said reactor having a bias winding opposing the effect of said control winding and an output winding inductively related to said control winding for producing a signal, the ampere turns of said control winding being double the ampere turns of said bias winding, a second magnetic amplifier having a first control winding energized by the output of said snap action magnetic amplifier and a second control winding energized by the output signal from said timing reactor, said second control winding counteracts the effectiveness of said first control winding until the core of said timing reactor is driven to positive saturation.

4. A control system for an electrical load device comprising a signal producing detector responsive to an electrical condition, electrical source for said load device, circuit means connecting said load device to said source and including a first saturable reactor having a core, reactance winding, and control windings for controlling the voltage being applied to said load device from said source, means for applying a bias current to one of said control windings such that said reactance winding effectively prevents said source from supplying said load device, means for supplying a current from said signal producing detector to a second of said control windings with the ampere turns supplied by said second control winding being sufficient to drive said core to saturation, time delay means, said time delay means comprising a second saturable reactor having first and second inductively related winding means and a saturable core, bias means connected to drive the core of said time delay means toward negative saturation, means for connecting a signal from said signal producing detector to said first winding means to drive said core of said time delay means to positive saturation, said second winding being connected to a third control winding on said first saturable reactor, the ampere turns of said third control winding opposing the ampere turns of said second control winding of said first saturable reactor so that said bias control winding on said first saturable reactor is effective to prevent the supply voltage to said first saturable reactor from being effective to cause operation of said load device, the characteristics of said time delay means being such that the signal from said detector produces a flux change in the core of said time delay means to provide current to said third control windings which counteract the effectiveness of the ampere turns of said second control winding until the core of said time delay means is driven to positive saturation.

5. A control system for an electrical load device comprising a signal producing detector responsive to an electrical condition on said load device, electrical source for said load device, circuit means connecting said load device to said source and including a first saturable reactor having a core, reactance winding, and control windings, for controlling the voltage being applied to said load device from said source, means for applying a bias current to one of said control windings such that said reactance winding effectively prevents said source from supplying said load device, means for supplying a current from said signal producing detector to a second of said control windings with the ampere turns supplied by said second control winding being sufficient to drive said core to saturation, time delay means, said time delay means comprising a second saturable reactor having first and second inductively related winding means and a saturable core, direct current bias means connected to drive the core of said time delay means toward negative saturation, means for connecting a signal from said signal producing detector to said first winding means to drive the core of said time delay means to positive saturation, said second winding being connected to a third control winding on said first saturable reactor, the ampere turns of said third control winding opposing the ampere turns of said second control winding of said first saturable reactor so that said bias control winding on said first saturable reactor is effective to prevent the supply voltage to said first saturable reactor from being effective to cause operation of said load device, the characteristics of said time delay means being such that the signal from said signal detector produces a flux change in the core of said time delay means to provide signal ampere turns to said third control windings to counteract the effectiveness of the ampere turns of said second control winding until the core of said time delay means is driven to positive saturation and means for varying the time of flux change in said core of said time delay means.

6. A control system for an electrical motor comprising a signal producing detector responsive to a predetermined electrical condition, electrical source for said electrical motor, circuit means connecting said motor to said source and including electromagnetic means for controlling the voltage being applied to said motor from said source, said electromagnetic means comprising a first saturable reactor having a core, reactance winding, and control windings, means for applying a bias current to one of said control windings such that said reactance winding effectively prevents said source from supplying said motor, means for supplying a current from said signal producing detector to a second of said control windings with the ampere turns supplied by said second control winding being sufficient to drive said core to saturation, time delay means, said time delay means comprising a second saturable reactor having first and second inductively related winding means and a saturable core, direct current bias means connected to drive the core of said time delay means toward negative saturation, means for connecting a signal from said signal producing detector to said first winding means to drive the core of said time delay means to positive saturation, an output circuit responsive to current induced in said second winding means for said time delay means during the period of change of saturation of the core of said time delay means for applying current to a third control winding on said first saturable reactor, resistance means in said output circuit for varying the time for changing the saturation of said timing core from negative to positive, the ampere turns of said third control winding opposing the ampere turns of said second control winding of said first saturable reactor so that said bias control winding on said first saturable reactor is effective to prevent the supply voltage to said electromagnetic means from being effective to cause operation of said motor, the characteristics of said time delay means being such that the application of a signal from said signal producing detector is effective during the flux change in the core of said time delay means to provide signal ampere turns to said third control windings to counteract the effectiveness of the ampere turns of said second control winding until the core of said time delay means is driven to positive saturation.

7. A control system for an electrical load device comprising a signal producing detector responsive to a predetermined electrical condition, an electrical source for said device, circuit means connecting said device to said source and including electromagnetic means for controlling the voltage being applied to said load device from said source, said electromagnetic means comprising a pair of first saturable reactors each having a core, reactance winding, and control windings, means for applying a bias current to one of said control windings on each of the cores of said first saturable reactors such that said reactance windings effectively prevent said source from supplying said load device, means for supplying a current from said signal producing detector to a second of said control windings on each of said cores with the ampere turns supplied by said second control windings being sufficient to drive the cores of said first saturable reactors to saturation, time delay means, said time delay means comprising a pair of second saturable reactors having first and second inductively related winding means and a saturable core, direct current bias means connected to drive the cores of said time delay means toward negative saturation, means for connecting a signal from said signal producing detector to said first winding means to selectively drive one of the cores of said time delay means to positive saturation, a pair of output circuits responsive to current induced in an associated said second winding means for said time delay means during the period of change of flux saturation of the selected core of said time delay means for applying current to a third control winding on a corresponding one of said first saturable reactors, the ampere turns of said third control windings opposing the ampere turns of a corresponding said second control winding of said first saturable reactor so that said bias control winding on said first saturable reactor is effective to prevent the supply voltage to said electromagnetic means from being effective to cause operation of said load device, the characteristics of said time delay means being such that the application of a signal from said signal producing device is effective during the flux change in the core of said time delay device to provide signal ampere turns to said third control windings to counteract the effectiveness of the ampere turns of said second control winding until the core of said time delay means is driven to positive saturation.

8. A control system for an electrical load device comprising a signal producing detector responsive to a predetermined electrical condition, an electrical source for said load device, circuit means connecting said load device to said source, electromagnetic means for preventing voltage from being applied from said source to said load device, said electromagnetic means comprising a pair of first saturable reactors, each of said first reactors having a core, a reactance winding, and control windings, said reactance windings being in circuit with said source and said load device, means for applying a bias current to one of said control windings such that said reactance winding effectively prevents said source from supplying said load device, means for supplying a current from said detector to a second of said control windings with the ampere turns supplied by said second control winding being sufficient to drive the core of said first reactor to saturation, time delay means, said time delay means comprising a second saturable reactor having first and second inductively related winding means and a saturable core, direct current bias means connected to drive the core of said time delay means toward negative saturation, means for connecting a signal from said detector to said first winding means to drive the core of said time delay means to positive saturation, an output circuit responsive to current induced in said second winding means for said time delay means during the period of change of saturation of the core of said time delay means for applying current to a third control winding on said first saturable reactor, the ampere turns of said third control winding opposing the ampere turns of said second control winding of said first saturable reactor that said bias control winding on said first saturable reactor is effective to prevent the supply voltage to said first saturable reactor from being effective to cause operation of said load device, the characteristics of said time delay means being such that the signal from said detector is effective during the flux change in the core of said time delay means to provide signal ampere turns to said third control windings which counteracts the effectiveness of the ampere turns of said second control windings until the core of said time delay means is driven to positive saturation.

9. A control system for an electrical load device comprising a signal producing detector responsive to a predetermined electrical condition, an electrical source for said load device, circuit means connecting said load device to said source, electromagnetic means for preventing voltage from being applied from said source to said load device, said electromagnetic means comprising a pair of first saturable reactors, each of said first reactors having a core, a reactance winding, and control windings, said reactance windings being in series circuit with said source and said load device, means for applying a bias current to one of said control windings such that said reactance winding effectively prevents said source from supplying said load device, means for supplying a current from said detector to a second of said control windings with the ampere turns supplied by said second control winding being sufficient to drive the core of said first saturable reactor to saturation, time delay means, said time delay means comprising a second saturable reactor having first and second inductively related winding means and a saturable core, direct current bias means connected to drive the core of said time delay means toward negative saturation, means for connecting a signal from said detector to said first winding means to drive the core of said time delay means to positive saturation, an output circuit responsive to current induced in said second winding means for said time delay means during the period of change of saturation of the core of said time delay means for applying current to a third control winding on said first saturable reactor, the ampere turns of said third control winding opposing the ampere turns of said second control winding of said first saturable reactor that said bias control winding on said first saturable reactor is effective to prevent the supply voltage to said first saturable reactor from being effective to cause operation of said load device, the characteristics of said time delay means being such that the signal from said detector is effective during the flux change in the core of said time delay means to provide signal ampere turns to said third control windings which counteracts the effectiveness of the ampere turns of said second control windings until the core of said time delay means is driven to positive saturation.

10. A control system for an electrical motor comprising a signal producing detector responsive to a predetermined electrical condition, an electrical source for said motor, circuit means connecting said motor to said source and including electromagnetic means for controlling the voltage being applied to said motor from said source, said electromagnetic means comprising a pair of first saturable reactors each having a core, reactance winding, and control windings, means for applying a bias current to one set of said control windings such that said reactance windings effectively prevent said source from supplying said motor, a pair of dead band magnetic amplifiers having rectifiers in their output circuit, said output circuits being connected to a corresponding second of said control windings of said electromagnetic means to supply a D.C. signal to said second winding, the ampere turns supplied by said second control winding being sufficient to drive said core to saturation, time delay means, said time delay means comprising a pair of second saturable reactors having first and second inductively related winding means and a saturable core, direct current bias means connected to drive the cores of said time delay means toward negative saturation, means connecting the output of said dead band amplifiers to corresponding said first winding means to selectively drive one of the cores of said time delay means to positive saturation, a pair of output circuits responsive to current induced in an associated said second winding means for said time delay means during the period of change of saturation of the selected core of said time delay means for applying current to a third control winding on a corresponding one of said first saturable reactors, the ampere turns of said third control winding opposing the ampere turns of a corresponding said second control winding of said first saturable reactor so that said bias control winding on said first saturable reactor is effective to prevent the supply voltage to said electromagnetic means from being effective to cause operation of said motor, the characteristics of said time delay means being such that the application of a signal from said signal producing device is effective during the flux change in the core of said time delay means to provide signal ampere turns to said third control windings to counteract the effectiveness of the ampere turns of said second control winding until the core of said time delay means is driven to positive saturation.

11. A control system for an electrical motor comprising a signal producing detector responsive to a predetermined electrical condition, an electrical source for said motor, circuit means connecting said motor to said source and including electromagnetic means for controlling the voltage being applied to said motor from said source, said electromagnetic means comprising a pair of first saturable reactors each having a core, reactance winding, and control windings, means for applying a bias current to one set of said control windings such that said reactance windings effectively prevent said source from supplying said motor, a pair of dead band magnetic amplifying said motor, a pair of dead band magnetic amplifiers, each of said amplifiers having a pair of saturable cores, a reactance winding and control windings for each of the saturable cores of said amplifiers, rectifiers in the output circuit of said dead band amplifiers, said output circuits being connected to a corresponding second of said control windings of said electromagnetic means to supply a D.C. signal to said second winding, the ampere turns supplied by said second control winding being sufficient to drive the core of said first saturable reactor to saturation, time delay means, said time delay means comprising a pair of second saturable reactors having first and second inductively related winding means and a saturable core, direct current bias means connected to drive the cores of said time delay means toward negative saturation, means connecting the output of said dead band amplifiers to corresponding said first winding means to selectively drive one of the cores of said time delay means to positive saturation, a pair of output circuits responsive to current induced in an associated said second winding means for said time delay means during the period of change of saturation of the selected core of said time delay means for applying current to a third control winding on a corresponding one of said first saturable reactors, the ampere turns of said third control winding opposing the ampere turns of a corresponding said second control winding of said first saturable reactor so that said bias control winding on said first saturable reactor is effective to prevent the supply voltage to said electromagnetic means from being effective to cause operation of said motor, the characteristics of said time delay means being such that the application of a signal from said signal producing detector is effective during the flux change in the core of said time delay means to provide signal ampere turns to said third control windings to counteract the effectiveness of the ampere turns of said second control winding until the core of said time delay means is driven to positive saturation.

12. A control system for an electrical motor comprising a signal detector responsive to a predetermined electrical condition, an electrical source, circuit means connecting said motor to said source and including electromagnetic means for controlling the voltage being applied to said motor from said source, said electromagnetic means comprising a pair of first saturable reactors each having a core, reactance winding, and control windings, means for applying a bias current to one set of said control windings such that said reactance windings effectively prevent said source from supplying said motor, a pair of dead band magnetic amplifiers controlled by said detector, and each of said amplifiers having a saturable core, a reactance winding, control windings, and rectifiers in their output circuit, a bias current supplied to one of said dead band amplifiers control winding such that said reactance winding effectively prevents said source from supplying said output circuit, said output circuit being connected to a corresponding second of said control windings of said electromagnetic means to supply a D.C. signal to said windings, the ampere turns supplied by said second control winding being sufficient to drive the core of said first saturable reactor to saturation, said signal responsive detector comprising a voltage comparator transformer connected to said supply means, rectifiers connected across the secondary of said transformer, a variable resistance in the output circuit of said transformer, a reference diode, said variable resistor and said diode being in circuit with a second control winding and said dead band amplifiers, time delay means, said time delay means comprising a pair of second saturable magnectic reactors having first and second inductively related winding means and a saturable core, direct current bias means connected to drive the cores of said time delay means toward negative saturation, means connecting the output of said dead band amplifiers to corresponding said first winding means to selectively drive one of the cores of said time delay means to positive saturation, a pair of output circuits responsive to current induced in an associated said second winding means for said time delay means during the period of change of saturation of the selected core of said time delay means for applying current to a third control winding on a corresponding one of said first saturable reactors, the ampere turns of said third control winding opposing the ampere turns of a corresponding said second control winding of said first saturable reactor so that said bias control winding on said first saturable reactor is effective to prevent the supply voltage to said magnetic means from being effective to cause operation of said motor, the characteristics of said time delay means being such that the application of a signal from said signal producing device is effective during the flux change in the core of said time delay means to provide signal ampere turns to said third control windings to counteract the effectiveness of the ampere turns of said second control winding until the core of said time delay means is driven to positive saturation.

13. A control system for a reversible electrical motor operating a transformer tap changer comprising a signal detector responsive to a predetermined electrical condition, an electrical source, circuit means connecting said motor to said source and including electromagnetic means for controlling the voltage being applied to said motor from said source and the direction of operation of said motor, said electromagnetic means comprising a first saturable reactor for controlling the motor in one direction and a second saturable reactor for controlling the operation of said motor in the reverse direction, each of said reactors having a core, reactance winding, and control windings, means for applying a bias current to one set of said control windings such that said reactance windings effectively prevent said source from supplying said motor, a raise and a lower dead band magnetic amplifier controlled by said detector, each of said amplifiers having a saturable core, a reactance winding, control windings and having rectifiers in their output circuit in series with their said reactance windings, each of said dead band amplifiers having a positive feed back control winding, a bias current supplied to one control winding on each of said dead band magnetic amplifiers such that said reactance windings effectively prevent said source from supplying said output circuits, said output circuit of said raise amplifier being connected to a corresponding second of said control windings of said first saturable reactor to supply a D.C. signal to said windings, said output circuit of said lower amplifier being connected to a corresponding second of said control windings on said second saturable reactor to supply a D.C. signal to said winding, the ampere turns supplied by said second control windings being sufficient to drive their respective said cores to saturation, said signal responsive detector comprising a voltage comparator transformer connected to said electrical source, full wave rectifiers connected across the secondary of said transformer, a variable resistance in the output circuit of said transformer, a reference diode, said variable resistor and said diode being in circuit with a second control winding on said dead band amplifiers, said second control windings on said raise dead band amplifier being opposite said second control winding on said lower dead band amplifier, so that upon receipt of a signal the ampere turns of one said second control winding opposes its associated said bias winding and the ampere turns of said other second control winding complements its associated bias winding and only one of said amplifiers is driven to saturation at any one time, time delay means, said time delay means comprising third and four saturable reactors having first and second inductively related winding means and a saturable core, direct current bias means connected to drive the cores of said time delay means toward negative saturation, means connecting the output of said raise dead band amplifier to a corresponding said first winding means to drive one of the cores of said time delay means to positive saturation, means connecting the output of said lower dead band amplifier to a corresponding said first winding means to drive the other of said cores of said time delay means toward negative saturation, a pair of output circuits responsive to current induced in an associated said second winding means for said time delay means during the period of change of saturation of the selected core of said time delay means, said output circuit associated with one core of said time delay means being connected to a third said control winding on said first saturable reactor for supplying current thereto, said output circuit associated with the other core of said time delay means being connected to a third said control winding on said second saturable reactor for supplying current thereto, the ampere turns of said third control windings opposing the ampere turns of a corresponding said second control winding of said first and second saturable reactors so that said bias control winding on said first and second saturable reactors is effective to prevent the supply voltage to said electromagnetic means from being effective to cause operation of said motor, the characteristics of said time delay means being such that the application of a signal from said signal producing device is effective during the flux change in the core of said time delay means to provide signal ampere turns to its corresponding said third control winding on said corresponding reactor to counteract the effectiveness of the ampere turns of said related second control winding until the core of said time delay means is driven to positive saturation.

References Cited in the file of this patent
UNITED STATES PATENTS

| | | |
|---|---|---|
| 2,327,357 | Lilja | Aug. 24, 1943 |
| 2,447,634 | Carlin et al. | Aug. 24, 1948 |
| 2,713,142 | Sealey | July 12, 1955 |

UNITED STATES PATENT OFFICE
CERTIFICATE OF CORRECTION

Patent No. 3,104,350            September 17, 1963

Franklin S. Malick

It is hereby certified that error appears in the above numbered patent requiring correction and that the said Letters Patent should read as corrected below.

Column 8, line 14, strike out "summing an out of band voltage"; line 15, for "operation" read -- voltage --.

Signed and sealed this 31st day of March 1964.

(SEAL)
Attest:

ERNEST W. SWIDER
Attesting Officer

EDWARD J. BRENNER
Commissioner of Patents